United States Patent
Cearra et al.

(10) Patent No.: US 12,319,113 B2
(45) Date of Patent: Jun. 3, 2025

(54) ENVIRONMENTAL CONTROL SYSTEM

(71) Applicant: THERMO KING LLC, Minneapolis, MN (US)

(72) Inventors: Diego Cearra, Kraluv Dvur (CZ); Pavel Houdek, Kutna Hora (CZ); Petra Stavova, Beroun (CZ); Martin Galansky, Rakovnik (CZ); Michal Kolda, Prague (CZ)

(73) Assignee: THERMO KING LLC, Minneapolis, MN (US)

( * ) Notice: Subject to any disclaimer, the term of this patent is extended or adjusted under 35 U.S.C. 154(b) by 316 days.

(21) Appl. No.: 17/940,790

(22) Filed: Sep. 8, 2022

(65) Prior Publication Data
US 2023/0084147 A1     Mar. 16, 2023

(30) Foreign Application Priority Data
Sep. 10, 2021   (EP) .................................... 21196109

(51) Int. Cl.
*B60H 1/00*        (2006.01)
(52) U.S. Cl.
CPC ..... *B60H 1/00021* (2013.01); *B60H 1/00371* (2013.01); *B60H 2001/00092* (2013.01); *B60H 2001/00107* (2013.01)
(58) Field of Classification Search
CPC ............ B60H 1/00021; B60H 1/00371; B60H 2001/00092; B60H 2001/00107
See application file for complete search history.

(56) References Cited

U.S. PATENT DOCUMENTS

2004/0221596 A1* 11/2004 Hille .................... B60H 1/039
165/41

FOREIGN PATENT DOCUMENTS

| DE | 102012010650 | 9/2013 |
| DE | 102019115416 | 12/2020 |
| JP | 2012-171522 | 9/2012 |

OTHER PUBLICATIONS

Extended European Search Report, issued in the corresponding EP patent application No. 21196109.9, dated Mar. 10, 2022, 7 pages.

* cited by examiner

*Primary Examiner* — Elizabeth J Martin
(74) *Attorney, Agent, or Firm* — HSML P.C.

(57) ABSTRACT

An environmental control system for thermally conditioning air within an enclosed space is provided. The system includes a refrigerant circuit having a compressor, an indoor heat exchanger, an expansion device, and an outdoor heat exchanger. The system also includes an exhaust flowpath having a first inlet for receiving an exhaust flow of thermally conditioned air from the enclosed space and an outlet for discharging the exhaust flow to an external environment. A heat transfer section of the outdoor heat exchanger is located in the exhaust flowpath The exhaust flowpath is configured to direct the exhaust flow of thermally conditioned air through the heat transfer section of the outdoor heat exchanger.

9 Claims, 7 Drawing Sheets

ENVIRONMENTAL CONTROL SYSTEM

FIELD OF THE INVENTION

The present invention is concerned generally with environmental control systems, such as heating, ventilation, and air conditioning (HVAC) systems, with heating and/or cooling mode capabilities. In particular, the present invention is concerned with environmental control systems and methods having improved energy efficiency.

BACKGROUND

Environmental control systems, such as HVAC systems, have been developed to manage the environmental conditions, e.g. temperature, of an enclosed space. For example, HVAC systems are often used to heat or cool the air within passenger cabins of mass-transit vehicles such as buses or trains.

Environmental control systems generally include a closed refrigerant circuit that includes a compressor, an indoor heat exchanger, an expansion device and an outdoor heat exchanger, which are connected in series. The refrigerant circuit generally defines a flowpath for a refrigerant which is to be used to transfer thermal energy between the internal and outdoor heat exchangers, to heat or cool an enclosed space (depending on whether the system is operating in a heating mode or a cooling mode of operation).

In a heating mode of operation, the refrigerant flow can be said to begin at the compressor, which is driven by a prime mover to compress the refrigerant to form a superheated refrigerant gas. The superheated refrigerant gas is then delivered to the indoor heat exchanger, which is in thermal communication with the enclosed space to be heated. The enclosed space will be relatively colder than the superheated refrigerant gas, such that heat energy within the refrigerant will be transferred to and thus heat the enclosed space. The indoor heat exchanger may be referred to as a condenser or gas cooler during the heating mode of operation because the refrigerant at this point has either condensed to a liquid or is in the form of a cooled gas (depending on the type of refrigerant used). The refrigerant is then delivered from the indoor heat exchanger to the expansion device (or a series of devices serving to reduce the refrigerant pressure, including expansion valves and expansion vessels for local refrigerant accumulation etc.). As the refrigerant passes through the expansion device, it expands in volume and forms a part liquid (and partly vapour) mixture which is at a reduced pressure and temperature. The refrigerant then passes to the outdoor heat exchanger which is in thermal communication with an external environment that is separate to the enclosed space (e.g. external to the vehicle). As ambient air circulates over the external heat exchanger, the refrigerant absorbs heat energy from the ambient air and evaporates. Accordingly, in the heating mode, the outdoor heat exchanger may be referred to as an evaporator. To complete a heating cycle about the refrigerant circuit, the refrigerant is delivered from the evaporator back to the compressor.

In a cooling mode of operation, the refrigerant flow direction about the circuit is reversed. From the compressor, the superheated refrigerant gas is directed to the outdoor heat exchanger. The ambient air will be relatively colder than the superheated refrigerant gas, such that heat energy within the refrigerant will be transferred to the ambient air. In this mode, the outdoor heat exchanger may be referred to as a condenser or gas cooler (again depending on the type of refrigerant used). The refrigerant is then delivered to the indoor heat exchanger via the expansion device. At the indoor heat exchanger, the refrigerant enters at a reduced pressure and temperature compared to that of the enclosed space, such that the refrigerant absorbs heat energy from the enclosed space and evaporates. Accordingly, in the cooling mode, the indoor heat exchanger may be referred to as an evaporator. To complete a cooling cycle about the refrigerant circuit, the refrigerant is then delivered from the indoor heat exchanger back to the compressor.

Conventionally, environmental control systems condition the air within the enclosed space by recirculating the air between the enclosed space and the indoor heat exchanger. At times, however, it is desirable to introduce fresh air into the enclosed space, e.g. while exhausting some of the thermally conditioned air to the external environment, as this can help to minimize the presence of contagions (such as COVID-19) within the enclosed space. However, the fresh air is typically at a different temperature to the conditioned air within the enclosed space and will therefore need to be heated or cooled to meet a set temperature condition of the enclosed space. To meet this additional heating/cooling demand, the system has to work harder, e.g. by driving the compressor at higher speeds, thereby increasing its energy consumption, and running costs. Having to condition fresh air introduced into the enclosed space also increases the time taken for the enclosed space to reach a set temperature condition.

Accordingly, the present invention seeks to improve the heating efficiency of environmental control systems, amongst other things.

SUMMARY OF THE INVENTION

According to an aspect, there is provided an environmental control system for thermally conditioning air within an enclosed space. The system comprises: a refrigerant circuit comprising a compressor, an indoor heat exchanger for thermally conditioning air within the enclosed space, an expansion device and an outdoor heat exchanger; and an exhaust flowpath having a first inlet for receiving an exhaust flow of thermally conditioned air from the enclosed space and an outlet for discharging the exhaust flow to an external environment; wherein a heat transfer section of the outdoor heat exchanger is located in the exhaust flowpath, and the exhaust flowpath is for directing the exhaust flow of thermally conditioned air through the heat transfer section of the outdoor heat exchanger.

The exhaust flowpath may comprise a second inlet for receiving fresh air from the external environment at a location which is upstream of the heat transfer section of the outdoor heat exchanger in an exhaust flow direction, whereby the exhaust flowpath is suitable for directing a mixture of fresh air and thermally conditioned air to the heat transfer section of the outdoor heat exchanger.

The first inlet may comprise a valve or damper for regulating the exhaust flow of thermally conditioned air from the enclosed space to the exhaust flowpath. There may also be provided one or more fans for regulating or otherwise encouraging the exhaust flow of thermally conditioned air along the exhaust flowpath.

The system may further comprise an intake flowpath having a first inlet for receiving an intake flow of fresh air from the external environment and an outlet for discharging the intake flow to the enclosed space. A heat-transfer section of the indoor heat exchanger may be located in the intake flowpath to thermally condition the intake flow before entering the enclosed space.

The intake flowpath may have a second inlet for receiving thermally conditioned air from the enclosed space at a location that is upstream of the heat transfer section of the indoor heat exchanger in the intake flow direction.

The environmental control system may comprise a controller which is configured to operate one or more valves or dampers according to a first flow configuration in which the one or more valves or dampers simultaneously: allow an exhaust flow of thermally conditioned air to pass through the exhaust flowpath; allow an intake flow of fresh air to pass through the intake flowpath; and prevent thermally conditioned air from the enclosed space to enter the intake flowpath.

The environmental control system may comprise a controller (e.g. the same controller referred to above) which is, e.g. further, configured to operate one or more valves or dampers according to a second flow configuration, in which the one or more valves or dampers simultaneously: allow an exhaust flow of thermally conditioned air to pass through the exhaust flowpath; allow an intake flow of fresh air to pass through the intake flowpath; and allow an intake flow of thermally conditioned air from the enclosed space to pass through the intake flowpath through the second inlet.

According to another aspect, there is provided a vehicle comprising an environmental control system as defined in any preceding statement. The environmental control system may further comprise one or more or all of the features of the system as described in the description below.

The enclosed space may be a passenger cabin of the vehicle and the external environment is exterior of the vehicle. The vehicle may be a mass-transit vehicle, such as a bus or train carriage.

It will be appreciated that the enclosed space may be only partly enclosed. For example, where the enclosed space is a passenger cabin of a vehicle, the passenger cabin is not necessarily airtight and may have windows or doors that can be opened and closed by the passengers.

According to another aspect, there is provided a method of thermally conditioning an enclosed space using an environmental control system as defined in any one of the preceding statements. The method may comprise: operating the refrigeration circuit to thermally condition air entering the enclosed space; and directing an exhaust flow of thermally conditioned air from the enclosed space along the exhaust flowpath through the heat transfer section of the outdoor heat exchanger.

According to an embodiment of the method, a controller of the environmental control system may operate one or more valves or dampers according to a first flow configuration in which the one or more valves or dampers simultaneously: allow an exhaust flow of thermally conditioned air to pass through the exhaust flowpath; allow an intake flow of fresh air to pass through the intake flowpath; and prevent thermally conditioned air from the enclosed space to enter the intake flowpath.

According to an embodiment of the method, a controller (e.g. the same controller as that described above) of the environmental control system may operate one or more valves or dampers according to a second flow configuration in which the one or more valves or dampers simultaneously: allow an exhaust flow of thermally conditioned air to pass through the exhaust flowpath; allow an intake flow of fresh air to pass through the intake flowpath; and allow an intake flow of thermally conditioned air from the enclosed space to pass through the intake flowpath.

It will be appreciated that the controller may be provided with computer-readable instructions that, when executed by the controller, cause the controller to perform the method described above, or to otherwise carry out one or more or all of the functional steps described above.

The enclosed space may be within a vehicle and the external environment may be exterior of the vehicle.

BRIEF DESCRIPTION OF THE DRAWINGS

The present invention will now be described by way of example with reference to the accompanying drawings, in which.

DETAILED DESCRIPTION

Figure 1:
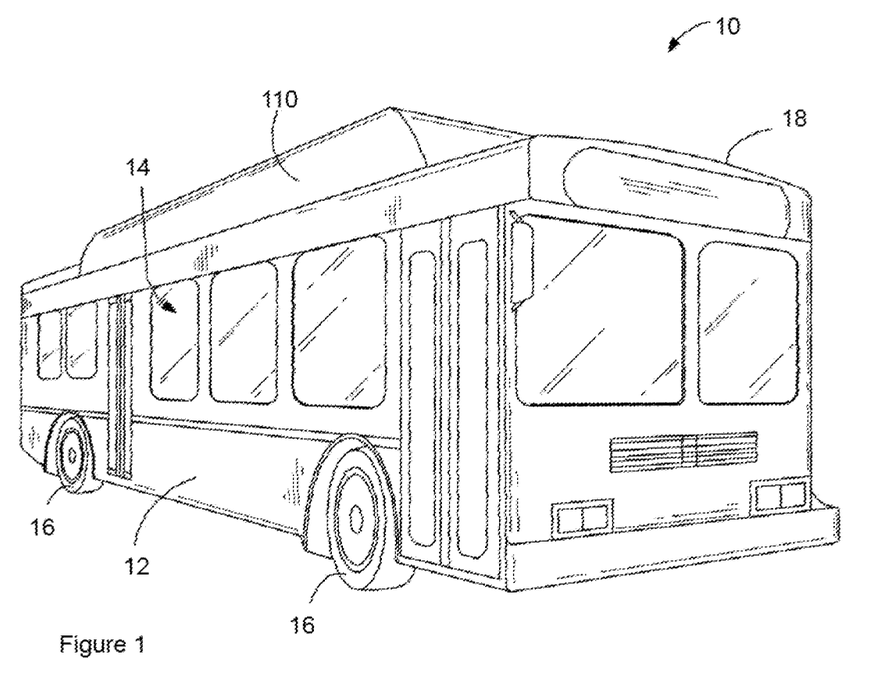
FIG. 1 is a schematic illustration of an exemplary vehicle with which the environmental control system of the present invention may be used.

FIG. 1 shows an exemplary vehicle 10 with which the environmental control system of the present invention may be used. In the embodiment illustrated in FIG. 1, the vehicle 10 is a mass-transit bus that carries passengers (not shown) between destinations. However, the present invention as described herein is applicable more generally to any type of vehicle or indeed any type of enclosed space that can be environmentally controlled. The system may be used, for example, with a train carriage.

As shown in FIG. 1, the vehicle 10 includes a frame 12, an enclosed space forming a passenger cabin 14 which is supported by the frame 12 and wheels 16. Although not shown, the vehicle 10 includes a propulsion system that is configured to drive the wheels 16 and drivetrain (not shown) of the vehicle 10. The propulsion system (e.g., prime mover, engine, etc.) can be an internal combustion engine or alternatively an electrical power source, e.g. a battery assembly, for powering a motor that is coupled to the drivetrain of the vehicle 10. The vehicle 10 may have a hybrid propulsion system comprising both an internal combustion engine and an electrical power source, which can be selectively used to power the drivetrain.

On a roof 18 of the vehicle 10, there is provided an environmental control system 110, in particular a HVAC system, which is configured to control one or more environmental conditions including, but not limited to, a thermal condition of the passenger cabin 14 which is at least partly enclosed.

The environmental control system may control the environmental conditions within an additional or an alternative enclosed space of the vehicle 10. Further, while FIG. 1 shows the environmental control system 110 being located on the roof 18 of the vehicle 10, it can have any location suitable for carrying out its intended purpose of controlling an environmental condition within the vehicle 10.

Figure 2:
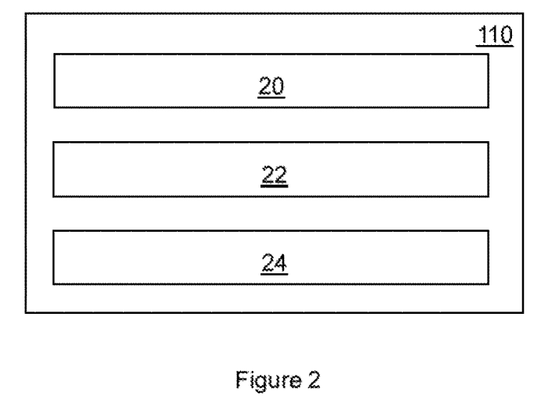
FIG. 2 is a block diagram schematically illustrating an example embodiment of the environmental control system.

FIG. 2 is a schematic diagram representing the environmental control system 110 in more detail.

The environmental control system 110 includes a programmable controller 20. The controller 20 may include a single integrated control unit (not shown) or a distributed network of control elements (not shown). The controller 20 can include a processor, a memory, a clock, and an input/output (I/O) interface (not shown).

Figure 3:
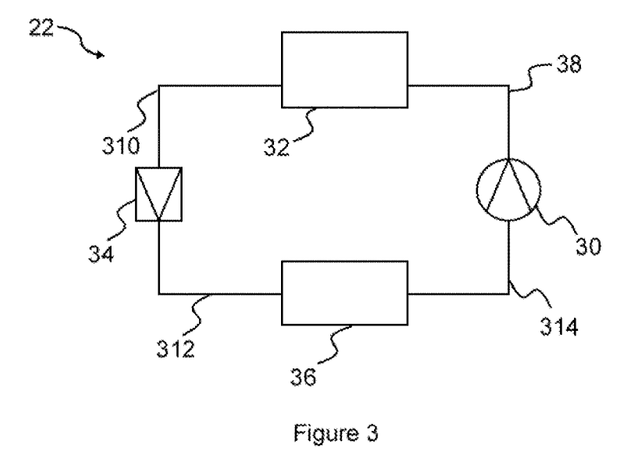
FIG. 3 is a circuit diagram schematically illustrating a refrigerant circuit of the environmental control system.

The environmental control system 110 also includes a closed refrigerant circuit 22. With reference to FIG. 3, the refrigerant circuit 22 comprises a compressor 30, an indoor heat exchanger 32, an expansion device 34 (or a series of devices serving to reduce the refrigerant pressure, including expansion valves and expansion vessels for local refrigerant accumulation etc.), and an outdoor heat exchanger 36 which are connected in series via refrigerant distribution lines 38, 310, 312, 314. The refrigerant circuit 22 generally defines a flowpath for a refrigerant, which is to be used to transfer thermal energy between the indoor heat exchanger 32 and the outdoor heat exchanger 36 as it flows from one to the other along the circuit 22. Any type of refrigerant that is known in the art may be used for this purpose.

The environmental control system 110 further includes a power bay 24, which houses an internal combustion engine (e.g., diesel engine, etc.), that can provide power to drive the compressor and other components of the refrigerant circuit 22. The power bay 24 may also or instead house an on-board electric motor which can provide power to drive the compressor and other components instead of the combustion engine.

The controller 20 itself is powered by a power module (not shown), which can include one or more electrical power sources. The power sources receive electrical power from a generator machine (e.g., a belt-driven alternator, a direct drive generator, etc.) that is mechanically driven by the prime mover of the internal combustion engine or electric motor of the power bay 24. In other embodiments, however, components of the power bay 24 and/or power module may be integrated with one or more components of the propulsion system of the vehicle 10. For example, where the propulsion system of the vehicle 10 is a hybrid or fully electric powered system, the on-board electric motor of the power bay 24 and/or the controller 20 of the environmental control system 110 may be powered by the electrical power source that is configured to power the drivetrain of the vehicle 10.

During operation, the controller 20 controls the refrigerant circuit 22 to obtain a desired state (i.e. temperature condition) of the passenger cabin 14. In particular, the controller 20 may be in communication with one or more sensing devices that are used to measure a number of operating conditions of the environmental control system 110, such as the internal temperature of the passenger cabin 14, ambient temperature of the external environment, and operating parameters of the environmental control system 110, such as evaporator temperature, pressures, etc. in order to allow the controller 20 to draw a conclusion on what action has to be taken to achieve the desired state.

The environmental control system 110 is configured with heating mode and cooling mode capabilities, and the controller 20 is configured to operate the refrigerant circuit 22 in either the heating mode or the cooling mode of operation as appropriate to achieve a set temperature condition within the passenger cabin 14. Furthermore, the controller 20 may compare the current state (e.g. passenger cabin air temperature and ambient air temperature) with a target state (e.g. a set point temperature for the passenger cabin 14) and regulate the current heating capacity or cooling capacity delivered by the environmental control system 110 accordingly. This may be done by sending control signaling to various control devices of the environmental control system 110, such as the compressor 30, refrigeration throttling valves, dampers etc., which control the movement of the refrigerant through the refrigerant circuit 20.

It will be appreciated that, in other embodiments, the environmental control system 110 may be configured with only one of the heating mode and cooling mode operations.

Figure 4:
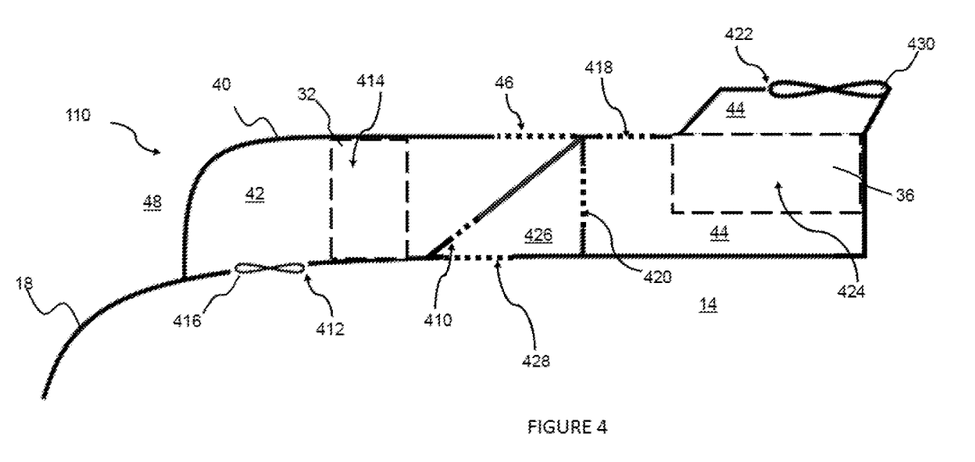
FIG. 4 schematically illustrates the environmental control system, in accordance with an embodiment of the present invention.

FIG. 4 schematically illustrates the environmental control system, in accordance with an embodiment of the present invention.

The system 110 comprises a housing 40 that encloses and protects some of the components of the refrigeration circuit. The housing 40 comprises a first compartment 42, within which the indoor heat exchanger 32 is located, and a second compartment 44, within which the outdoor heat exchanger 36 is located.

The first compartment 42 has a first air inlet 46 on the exterior of the housing 40, which is suitable for receiving a flow of fresh air into the first compartment 42 from the external environment 48 exterior to the vehicle. A second air inlet 410 of the first compartment 42 is fluidically connected to the passenger cabin 14, so that the first compartment 42 is suitable for receiving a flow of thermally conditioned air from the passenger cabin 14 in addition to, or instead of, the fresh air from the external environment 48. The first compartment 42 also has an air outlet 412, which fluidically connects the first compartment 42 to the passenger cabin 14, so that air is able to be discharged from the first compartment 42 and into the passenger cabin 14.

The indoor heat exchanger 32 comprises a heat-transfer section 414 which is located in the first compartment 42 at an intermediate location that is downstream of the first and second air inlets 46, 410 but upstream of the air outlet 412 in a flow direction. In use, fresh air received in the first compartment 42 through the first air inlet 46 and/or thermally conditioned air received in the first compartment 42 through the second air inlet 410 will be directed through (or otherwise will be in thermal communication with) the heat transfer section 414 of the indoor heat exchanger 32 to thermally condition the air. The thermally conditioned air will then be supplied to the passenger cabin 14 via the air outlet 412.

In the manner described above, the first compartment 42 defines, at least in part, an intake flowpath in that it is suitable for directing an intake flow of air (fresh air and/or thermally conditioned air) to the passenger compartment 14 via the indoor heat exchanger 32. To promote airflow through the intake flowpath, the first compartment 42 has a fan 416 which is operable to draw air into the first compartment 42 and correspondingly eject air from the first compartment 42 through the air outlet 412.

The second compartment 44 has a first air inlet 418 on the exterior of the housing 40, which is suitable for receiving fresh air from the external environment 48. The second compartment 44 further comprises an air outlet 422 on the exterior of the housing 40, so that air is able to be discharged from the second compartment 44 to the external environment 48.

The outdoor heat exchanger 36 comprises a heat-transfer section 424 which is located in the second compartment 44 at an intermediate location that is downstream of the first air inlet 418 but upstream of the air outlet 422 in a flow direction. In use, air received in the second compartment 44 will be directed through (or otherwise will be in thermal communication with) the heat transfer section 424 before exiting the second compartment 44 via the air outlet 422. The outdoor heat exchanger 36 is configured to exchange thermal energy between the refrigerant of the circuit 20 and the airflow passing through its heat transfer section 424.

In conventional environmental control systems, the second compartment 44 which houses the outdoor heat exchanger 36 is separate to, and fluidically isolated from, the passenger cabin 14 which is to be thermally conditioned. That is, the outdoor heat exchanger 36 will exchange thermal energy with fresh air received from the external environment 48 only. However, in contrast to those arrangements, in the environmental control system of the present invention the passenger cabin 14 is fluidically connected to the second compartment 44 such that an exhaust flow of thermally conditioned air may be directed from the cabin 14 to the heat transfer section 424 of the outdoor heat exchanger 36 in addition to, or instead of, the fresh air from the external environment 48.

The second compartment 44 comprises a second air inlet 420 for receiving the exhaust flow of thermally conditioned air from the passenger cabin 14. The second air inlet 420 is located in the second compartment 44 at a position that is upstream of the heat transfer section 424 of the outdoor heat exchanger 36 in the exhaust flow direction. The first compartment 42 is therefore suitable for mixing fresh air and thermally conditioned air before that mixture enters the heat transfer section 424 of the outdoor heat exchanger 36.

The second air inlet 420 of the second compartment 44 is fluidically connected to the passenger cabin 14 via a third compartment 426 of the housing 40. The third compartment 426 has a single inlet 428 for receiving thermally conditioned air from the passenger cabin 14 and is suitable for directing conditioned air to the second air inlet 420 of the second compartment 44. The second compartment 44 and the third compartment 426 therefore define an exhaust flowpath for directing the exhaust flow of thermally conditioned air from the cabin 14 to the external environment 48 via the heat transfer section 424 of the outdoor heat exchanger 36. The exhaust flowpath further comprises a fan 430 which is operable to promote air flow through the exhaust flowpath.

Both the indoor and outdoor heat exchangers 32, 36 are refrigerant-to-air heat exchangers in that they are configured to transfer thermal energy between a refrigerant (of the refrigerant circuit) and air passing through their respective heat transfer sections 414, 424. Any known type of refrigerant-to-air heat exchanger may be used, such as a finned-tube-coil heat exchanger, in which refrigerant flows through a coiled tube (the heat transfer section) and air is directed over the coiled tube so as to exchange thermal energy with the refrigerant in the tube.

As is illustrated by the dashed lines in FIG. 4, in the present embodiment, the inlets and outlets described above each comprises air-regulating means, such as a valve or damper (e.g. a flap), for controlling the airflow therethrough. Accordingly, each inlet and/or outlet has a fully open and a fully closed configuration for respectively allowing and preventing a flow of air therethrough. In embodiments, an inlet/outlet can be set to an intermediate, partially open/closed configuration. The valve may be an electronic valve which is actuated (and thus set to the open, closed, or intermediate configuration) under the direction of control signalling received from the controller 20 of the system 110.

It will be appreciated that the structure of the intake flowpath and the exhaust flowpath may differ from that described above. For example, the intake flowpath may comprise more than one compartment or duct that fluidically connect the external environment 48 (and/or passenger cabin 14) to the passenger cabin 14 via the indoor heat exchanger 32. Further, the second inlet 410 to the first compartment 42 may receive thermally conditioned air from the exhaust flowpath (the third compartment 426 in FIG. 4) or a separate source to the exhaust flowpath (e.g. the cabin 14 directly). The exhaust flowpath may comprise only one compartment or duct. The third compartment 426 may be omitted and the second inlet 410 to the first compartment 42 and the second inlet 420 to the second compartment 44 may be configured to receive thermally conditioned air directly from the passenger cabin 14.

It will also be appreciated that the exact configuration and number of valves or dampers and fans may differ from system to system and may depend on the structure and number of compartments used to define the flowpaths. For example, there is no strict need for a valve or damper at the inlet 428 to the third compartment 426. The inlet 428 may be permanently open.

Although the indoor heat exchanger 32 and the outdoor heat exchanger 34 have been described above as being located within the first compartment 42 and the second compartment 44, respectively, in practice it may be that only the heat transfer sections 414, 424 of those heat exchangers 32, 36 are located within the first and second compartments 42, 44 (and thus their corresponding flowpaths).

Figure 5:
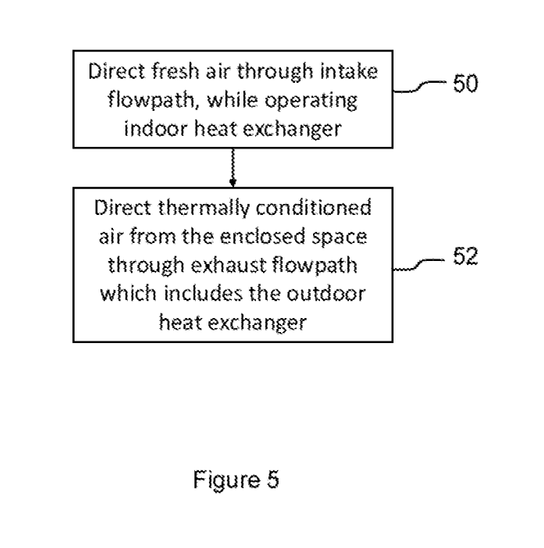
FIG. 5 is a flow diagram schematically illustrating a method of operating the environmental control system of FIGS. 1 to 4.

FIG. 5 is a flow diagram schematically illustrating a method of operating the environmental control system of FIGS. 1 to 4 to thermally condition the passenger cabin 14 of the vehicle 10.

The method begins at block 50, at which fan 416 operates to draw an intake flow of fresh air along the intake flowpath. The intake flow is directed along an intake flow direction from the first inlet 46 of the first compartment 42, through the heat transfer section 414 of the indoor heat exchanger 32 and to the passenger cabin 14 via outlet 412. The refrigerant circuit 22 is operated by the controller 20 to drive a refrigerant between the indoor heat exchanger 32 and the outdoor heat exchanger 36 in a heating mode of operation or a cooling mode of operation, to respectively heat or cool the intake flow before the thermally conditioned intake flow is directed onwards to the cabin 14.

At substantially the same time, at block 52, thermally conditioned air is exhausted from the passenger cabin 14 and is directed along the exhaust flowpath in an exhaust flow direction from the inlet 428 of the third compartment 426, through the heat transfer section 424 of the outdoor heat exchanger 36 and to the external environment 48 via outlet 422.

The exhaust flow of thermally conditioned air received in the second compartment 44 through the second inlet 420 will mix with the fresh air introduced to the second compartment 44 via the first inlet 418 before that mixture is then directed through the heat transfer section 424.

In the heating mode of operation, the exhaust flow of thermally conditioned air entering the second compartment 44 will have a higher temperature than the fresh air entering the second compartment 44 via the first inlet 418. In the cooling mode of operation, the exhaust flow of thermally conditioned air entering the second compartment 44 will have a lower temperature than the fresh air entering the compartment 44. Therefore, by directing thermally conditioned air through the exhaust flowpath, the exhaust flow can be used advantageously to increase the temperature difference and thus the extent of heat transfer between the air flowing through the outdoor heat exchanger 36 and the refrigerant therein. This can improve the operating conditions of the outdoor heat exchanger 36 and consequently the refrigeration circuit 22 will operate under better operating conditions for higher energy efficiency. This will now be described in further detail for the heating mode and the cooling mode of operation, in turn.

In the heating mode of operation, the refrigerant is configured to evaporate as relatively hotter fresh air passes through the heat transfer section 424 of the outdoor heat exchanger 36. However, the exhaust flow of thermally conditioned (heated) air will, when mixed with the fresh air received in the second compartment 44, increase the temperature of the air mixture flowing through the heat transfer section 424, and in turn the temperature difference between the air mixture and the refrigerant in the heat transfer section 424. This may increase an extent of heat transfer between the air mixture and the refrigerant, thereby improving the efficiency of the system.

Further, increasing the temperature of the air mixture has the effect of increasing the evaporating temperature and pressure, and also the condensing temperature and pressure of the refrigeration circuit 22, accordingly. At these shifted operating conditions, the refrigerant density at the compressor inlet (suction line 314) increases, which results in a higher refrigerant mass flow through the circuit 22. It will be appreciated that, with an increased mass flow through the circuit, the heating capacity of the indoor heat exchanger 32 (condenser) is increased; the enthalpy difference between the refrigerant inlet and outlet of the indoor heat exchanger (condenser) remains very similar. The compressor power input remains substantially the same because of a smaller ratio between compressor suction and discharge pressures. In this way, the invention may have the effect of increasing the heating capacity of the indoor heat exchanger 32 without substantially increasing the compressor power input, thereby further improving the energy efficiency of the system.

In the cooling mode of operation, the refrigerant is configured to be cooled and, depending on the refrigerant used, condensed by relatively colder fresh air as it passes through the heat transfer section 424 of the outdoor heat exchanger 36. However, the exhaust flow of thermally conditioned (cooled) air will, when mixed with the fresh air received in the second compartment 44, reduce the temperature of the air mixture that enters and passes through the heat transfer section 424. This may increase the temperature difference between the air mixture and the refrigerant in the heat transfer section 424 and thus the extent of heat transfer between the air mixture and the refrigerant. Further, it has the effect of reducing the condensing temperature and pressure of the refrigeration circuit 22 towards the evaporating temperature and pressure of the circuit. Consequently, a pressure differential between the high- and low-pressure sides of the refrigeration circuit 22 becomes smaller, meaning that the compressor 22 has to work less, thereby lowering its power consumption.

It will be appreciated that, although the invention has been described above as directing a mixture of thermally conditioned air and fresh air through the outdoor heat exchanger 36, this is not required. For example, in use the first inlet 418 to the second compartment 44 may be closed to prevent fresh air from entering the second compartment 44. In that case, only thermally conditioned air will be directed through the heat transfer section 424 of the outdoor heat exchanger 36. This may further increase the temperature difference and thus the extent of heat transfer between the air flowing through the outdoor heat exchanger 36 and the refrigerant therein. It may also further improve the operating conditions of the refrigerant circuit, as described above.

While it may be advantages to direct thermally conditioned air through the heat transfer section of the outdoor heat exchanger at substantially the same time as an intake flow of thermally conditioned fresh air enters the passenger cabin, e.g. to maintain a constant air pressure within the cabin, this is not required. Energy efficiency can be improved wherever thermally conditioned air from the enclosed space is directed through the heat transfer section of the outdoor heat exchanger.

As will now be described with respect to FIGS. 6 to 8, the system 110 is preconfigured with three possible flow configurations, which can be selected by the controller 20, e.g. under user instruction.

Figure 6:
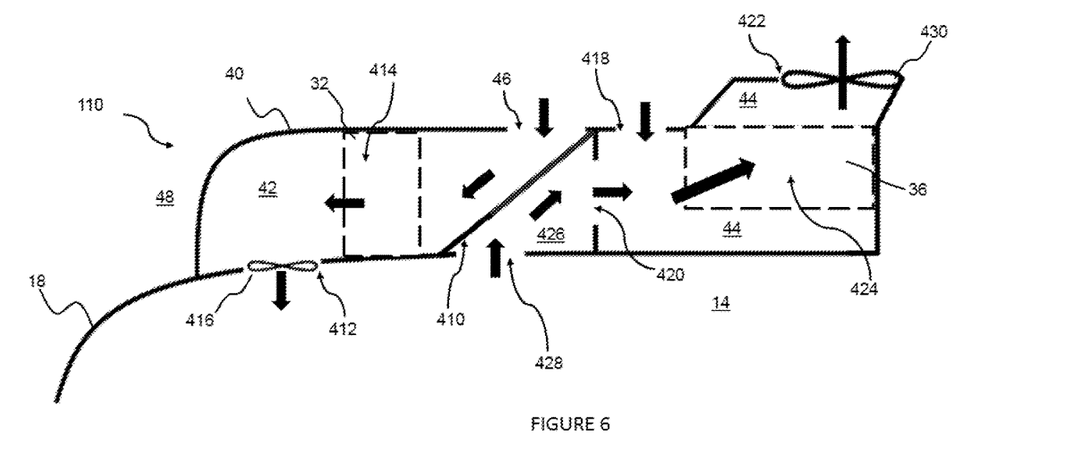
FIG. 6 schematically illustrates a first flow configuration of the environmental control system.

FIG. 6 schematically illustrates a first flow configuration of the environmental control system 110, where the flow direction through the system is indicated by arrows.

In this configuration, 100% of the intake flow through the intake flowpath and thus the indoor heat exchanger 32 is fresh air received from the external environment 48. That is, thermally conditioned air which may be contaminated by passengers in the cabin 14 is not recirculated or returned to the cabin. Accordingly, a valve or damper of the first inlet 46 to the first compartment 42 is in a partially or fully open position to allow a supply of fresh air to enter the intake flowpath (first compartment 42) through the first inlet 46. However, a valve or damper of the second inlet 410 to the first compartment 42 is closed to prevent the thermally conditioned air from entering the first compartment 42.

The intake flow is directed to the heat transfer section 414 of the indoor heat exchanger 32 and the newly conditioned air exiting the heat transfer section 414 of the indoor heat exchanger 32 is supplied to the passenger cabin 14 through outlet 412, the valve or damper of which is open.

At the same time, valves or dampers of the inlet 428 to the third compartment 426, and the first and second inlets 418, 420 to the second compartment 44 are open, such that the second compartment 44 will receive fresh air from the external environment 48 as well as an exhaust flow of thermally conditioned air from the passenger cabin 14. In the second compartment 44, the thermally conditioned air mixes with the fresh air before that air mixture passes through the heat transfer section 424 of the outdoor heat exchanger 36. The air mixture is then discharged from the second compartment 44 through an open valve or damper of the outlet 422.

It will be appreciated that the flow rate or volume of thermally conditioned air that is exhausted from the passenger cabin 14 may be set to match that of the intake flow entering the passenger cabin 14, to maintain a constant air pressure within the cabin 14. This may be achieved by regulating the extent by which one or more of the valves or dampers are open/closed.

Figure 7:
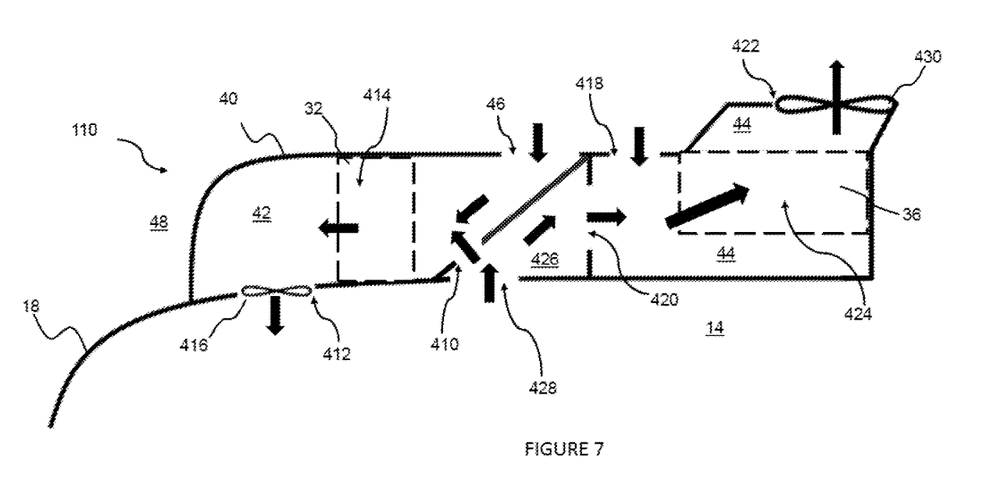
FIG. 7 schematically illustrates a second flow configuration of the environmental control system.

FIG. 7 schematically illustrates a second flow configuration of the environmental control system 110, where the flow direction through the system is indicated by arrows.

The second configuration is substantially the same as the first configuration described above with respect to FIG. 6, except that a valve or damper of the second inlet 410 to the first compartment 42 is open, such that a mixture of fresh air and thermally conditioned cabin air is supplied to the intake flowpath for thermal conditioning before entering the passenger cabin 14. The amount of fresh air entering the first compartment 42, e.g. as a percentage of total air entering the first compartment 42, can be controlled by setting or adjusting the extent by which the valves or dampers at inlets 46 and 410 are open/closed.

It will again be appreciated that, although the invention has been described above as directing a mixture of thermally conditioned air and fresh air through the heat transfer section 424 of the outdoor heat exchanger 36, this is not required. In both embodiments of FIGS. 6 and 7, the first inlet 418 to the second compartment 44 may be closed to prevent fresh air from entering the second compartment 44.

Figure 8:
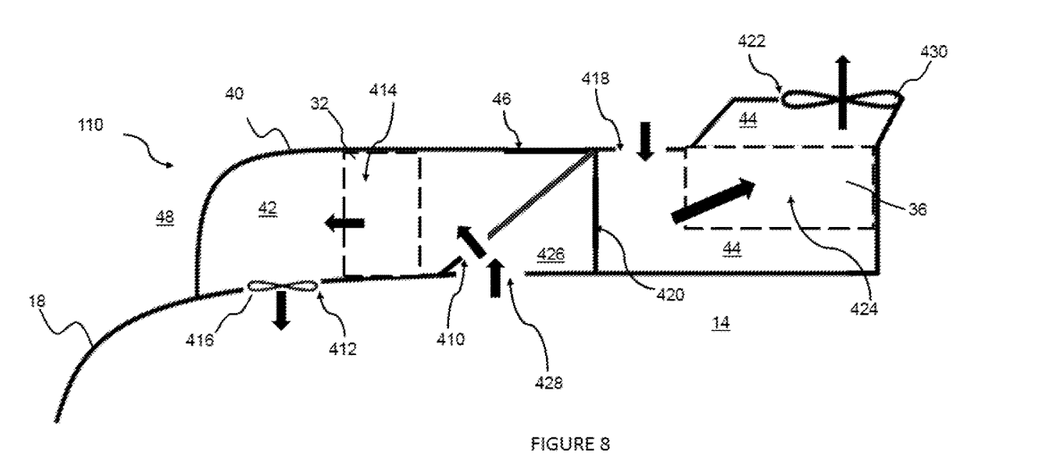
FIG. 8 schematically illustrates a third flow configuration of the environmental control system.

FIG. 8 schematically illustrates a third flow configuration of the environmental control system 110, in which zero fresh air is introduced into the cabin 14.

In this configuration, the valve or damper of the first inlet 46 to the first compartment 42 is closed to prevent fresh air from entering the first compartment 42. The valves or dampers of the inlet 428 to the third compartment 426 and the second inlet 410 to the first compartment 42 is open to allow thermally conditioned cabin air to enter the first compartment 42 (intake flowpath) before being recirculated to the cabin 14 via the heat transfer section 414 of the indoor heat exchanger 32.

The valve or damper of the first inlet 418 to the second compartment 44 is open to receive a supply of fresh air in the second compartment 44. The valve or damper of the second inlet 420, however, is closed to prevent thermally conditioned air from entering the second compartment 44. Accordingly, only fresh air will be directed through the heat transfer section 424 of the outdoor heat exchanger 36 before exiting the compartment via outlet 422.

While the third flow configuration does not direct thermally conditioned air through the outdoor heat exchanger 36, and therefore does not benefit from the above-described advantages of the invention, it may nevertheless be advantageous to provide a system which can utilise the third flow configuration as an alternative option for the user, to be used should an intake of fresh air to the cabin be undesirable. For example, its inclusion in addition to the first and/or second flow configuration provides a more versatile system.

In view of the above, it can be seen that the present invention provides a versatile environmental control system that can be used advantageously to increase system efficiency.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. That is, the present disclosure is not limited to the embodiments above described and except where mutually exclusive, any of the features may be employed separately or in combination with any other features and the disclosure extends to and includes all combinations and sub-combinations of one or more features described herein.

The word "embodiment" as used within this specification may, but does not necessarily, refer to the same embodiment. This specification and the embodiments described are examples only. Other and further embodiments may be devised without departing from the basic scope thereof, with the true scope of the disclosure being indicated by the claims that follow.

The invention claimed is:

1. An environmental control system for thermally conditioning air within an enclosed space, comprising:
   a refrigerant circuit comprising a compressor, an indoor heat exchanger for thermally conditioning air within the enclosed space, an expansion device and an outdoor heat exchanger;
   an exhaust flowpath having a first inlet for receiving an exhaust flow of thermally conditioned air from the enclosed space and an outlet for discharging the exhaust flow to an external environment; and
   an intake flowpath having a first inlet for receiving an intake flow of fresh air from the external environment and an outlet for discharging the intake flow to the enclosed space, wherein a heat transfer section of the indoor heat exchanger is located in the intake flowpath to thermally condition the intake flow before entering the enclosed space,
   wherein a heat transfer section of the outdoor heat exchanger is located in the exhaust flowpath, and the exhaust flowpath is for directing the exhaust flow of thermally conditioned air through the heat transfer section of the outdoor heat exchanger,
   wherein the intake flowpath has a second inlet for receiving thermally conditioned air from the enclosed space at a location that is upstream of the heat transfer section of the indoor heat exchanger in the intake flow direction,
   wherein the exhaust flowpath comprises a second inlet for receiving fresh air from the external environment at a location which is upstream of the heat transfer section of the outdoor heat exchanger in an exhaust flow direction, whereby the exhaust flowpath is suitable for directing a mixture of fresh air and thermally conditioned air to the heat transfer section of the outdoor heat exchanger,
   wherein the environmental control system comprises a controller which is configured to operate one or more valves or dampers according to a first flow configuration in which the one or more valves or dampers simultaneously:
   allow an exhaust flow of thermally conditioned air to pass through the exhaust flowpath;
   allow an intake flow of fresh air to pass through the intake flowpath; and
   prevent thermally conditioned air from the enclosed space from entering the intake flowpath.

2. The environmental control system of claim 1, wherein the first inlet comprises a valve or damper for regulating the exhaust flow of thermally conditioned air from the enclosed space to the exhaust flowpath.

3. The environmental control system of claim 1, wherein the environmental control system comprises a controller which is configured to operate one or more valves or dampers according to a second flow configuration, in which the one or more valves or dampers simultaneously:
   allow an exhaust flow of thermally conditioned air to pass through the exhaust flowpath;
   allow an intake flow of fresh air to pass through the intake flowpath; and
   allow an intake flow of thermally conditioned air from the enclosed space to pass through the intake flowpath through the second inlet.

4. A vehicle comprising:
an environmental control system for thermally conditioning air within an enclosed space, the environmental control system including:
a refrigerant circuit comprising a compressor, an indoor heat exchanger for thermally conditioning air within the enclosed space, an expansion device and an outdoor heat exchanger;
an exhaust flowpath having a first inlet for receiving an exhaust flow of thermally conditioned air from the enclosed space and an outlet for discharging the exhaust flow to an external environment; and
an intake flowpath having a first inlet for receiving an intake flow of fresh air from the external environment and an outlet for discharging the intake flow to the enclosed space, wherein a heat transfer section of the indoor heat exchanger is located in the intake flowpath to thermally condition the intake flow before entering the enclosed space,
wherein a heat transfer section of the outdoor heat exchanger is located in the exhaust flowpath, and the exhaust flowpath is for directing the exhaust flow of thermally conditioned air through the heat transfer section of the outdoor heat exchanger,
wherein the intake flowpath has a second inlet for receiving thermally conditioned air from the enclosed space at a location that is upstream of the heat transfer section of the indoor heat exchanger in the intake flow direction,
wherein the exhaust flowpath comprises a second inlet for receiving fresh air from the external environment at a location which is upstream of the heat transfer section of the outdoor heat exchanger in an exhaust flow direction, whereby the exhaust flowpath is suitable for directing a mixture of fresh air and thermally conditioned air to the heat transfer section of the outdoor heat exchanger, and
wherein the environmental control system comprises a controller which is configured to operate one or more valves or dampers according to a first flow configuration in which the one or more valves or dampers simultaneously:
allow an exhaust flow of thermally conditioned air to pass through the exhaust flowpath;
allow an intake flow of fresh air to pass through the intake flowpath; and
prevent thermally conditioned air from the enclosed space from entering the intake flowpath.

5. The vehicle of claim 4, wherein the enclosed space is a passenger cabin of the vehicle and the external environment is exterior of the vehicle.

6. The vehicle of claim 5, wherein the vehicle is a mass-transit vehicle.

7. A method of thermally conditioning an enclosed space using an environmental control system that includes: a refrigerant circuit comprising a compressor; an indoor heat exchanger for thermally conditioning air within the enclosed space; an expansion device and an outdoor heat exchanger; an exhaust flowpath having a first inlet for receiving an exhaust flow of thermally conditioned air from the enclosed space and an outlet for discharging the exhaust flow to an external environment; and an intake flowpath having a first inlet for receiving an intake flow of fresh air from the external environment and an outlet for discharging the intake flow to the enclosed space, wherein a heat transfer section of the indoor heat exchanger is located in the intake flowpath to thermally condition the intake flow before entering the enclosed space, wherein a heat transfer section of the outdoor heat exchanger is located in the exhaust flowpath, and the exhaust flowpath is for directing the exhaust flow of thermally conditioned air through the heat transfer section of the outdoor heat exchanger, wherein the intake flowpath has a second inlet for receiving thermally conditioned air from the enclosed space at a location that is upstream of the heat transfer section of the indoor heat exchanger in the intake flow direction, wherein the exhaust flowpath comprises a second inlet for receiving fresh air from the external environment at a location which is upstream of the heat transfer section of the outdoor heat exchanger in an exhaust flow direction, whereby the exhaust flowpath is suitable for directing a mixture of fresh air and thermally conditioned air to the heat transfer section of the outdoor heat exchanger, the method comprising:
operating the refrigeration circuit to thermally condition air entering the enclosed space;
directing an exhaust flow of thermally conditioned air from the enclosed space along the exhaust flowpath through the heat transfer section of the outdoor heat exchanger; and
operating the one or more valves or dampers according to a first flow configuration in which the one or more valves or dampers simultaneously:
allow an exhaust flow of thermally conditioned air to pass through the exhaust flowpath;
allow an intake flow of fresh air to pass through the intake flowpath; and
prevent thermally conditioned air from the enclosed space from entering the intake flowpath.

8. The method of claim 7, wherein the intake flowpath has a second inlet for receiving thermally conditioned air from the enclosed space at a location that is upstream of the heat transfer section of the indoor heat exchanger in the intake flow direction, and
wherein:
a controller of the environmental control system operates one or more valves or dampers according to a second flow configuration in which the one or more valves or dampers simultaneously:
allow an exhaust flow of thermally conditioned air to pass through the exhaust flowpath;
allow an intake flow of fresh air to pass through the intake flowpath; and
allow an intake flow of thermally conditioned air from the enclosed space to pass through the intake flowpath.

9. The method of claim 7, wherein the enclosed space is within a vehicle and the external environment is exterior of the vehicle.

* * * * *